(12) United States Patent  
Chang

(10) Patent No.: US 8,783,117 B2
(45) Date of Patent: Jul. 22, 2014

(54) FAN TESTING APPARATUS AND TESTING METHOD

(75) Inventor: Yao-Ting Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 161 days.

(21) Appl. No.: 13/459,098

(22) Filed: Apr. 28, 2012

(65) Prior Publication Data

US 2013/0167657 A1  Jul. 4, 2013

(30) Foreign Application Priority Data

Dec. 30, 2011  (TW) .............................. 100149750 A

(51) Int. Cl.
*G01P 5/06*  (2006.01)

(52) U.S. Cl.
USPC ....................................................... 73/861.85

(58) Field of Classification Search
USPC .................. 73/861, 861.85, 865.6, 141, 499; 702/56
See application file for complete search history.

(56) References Cited

U.S. PATENT DOCUMENTS

| | | | | |
|---|---|---|---|---|
| 5,099,685 A | * | 3/1992 | McLean et al. | 73/147 |
| 6,470,740 B2 | * | 10/2002 | Li | 73/147 |
| 8,567,268 B2 | * | 10/2013 | Sun et al. | 73/865.6 |
| 2007/0288181 A1 | * | 12/2007 | Kuo et al. | 702/56 |
| 2011/0179865 A1 | * | 7/2011 | Chen et al. | 73/499 |
| 2011/0283808 A1 | * | 11/2011 | Sun et al. | 73/861 |

* cited by examiner

*Primary Examiner* — Jewel V Thompson
(74) *Attorney, Agent, or Firm* — Novak Druce Connolly Bove + Quigg LLP

(57) ABSTRACT

A fan testing apparatus includes an air duct defining an air inlet and air outlet, and at least one anemometer mounted at the air outlet. The fan is received in the air duct to generate airflow in the air duct via the inlet and out of the air duct via the outlet, and the at least one anemometer is used to measure wind speed at the outlet.

6 Claims, 3 Drawing Sheets

FAN TESTING APPARATUS AND TESTING METHOD

BACKGROUND

1. Technical Field

The present disclosure relates to a testing apparatus and a testing method, and particularly to a testing apparatus and a testing method for a fan.

2. Description of Related Art

Many electronic products are equipped with one or more fans for heat dissipation. The fans mounted in the electronic product should performance well enough to prevent the electronic product from overheating. Fan testing may require expensive equipment and take a lot of time. Therefore, only samples from production batches of fans may be tested, which means some malfunctioning fans may be passed along for use.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references can mean "at least one."

Figure 1:
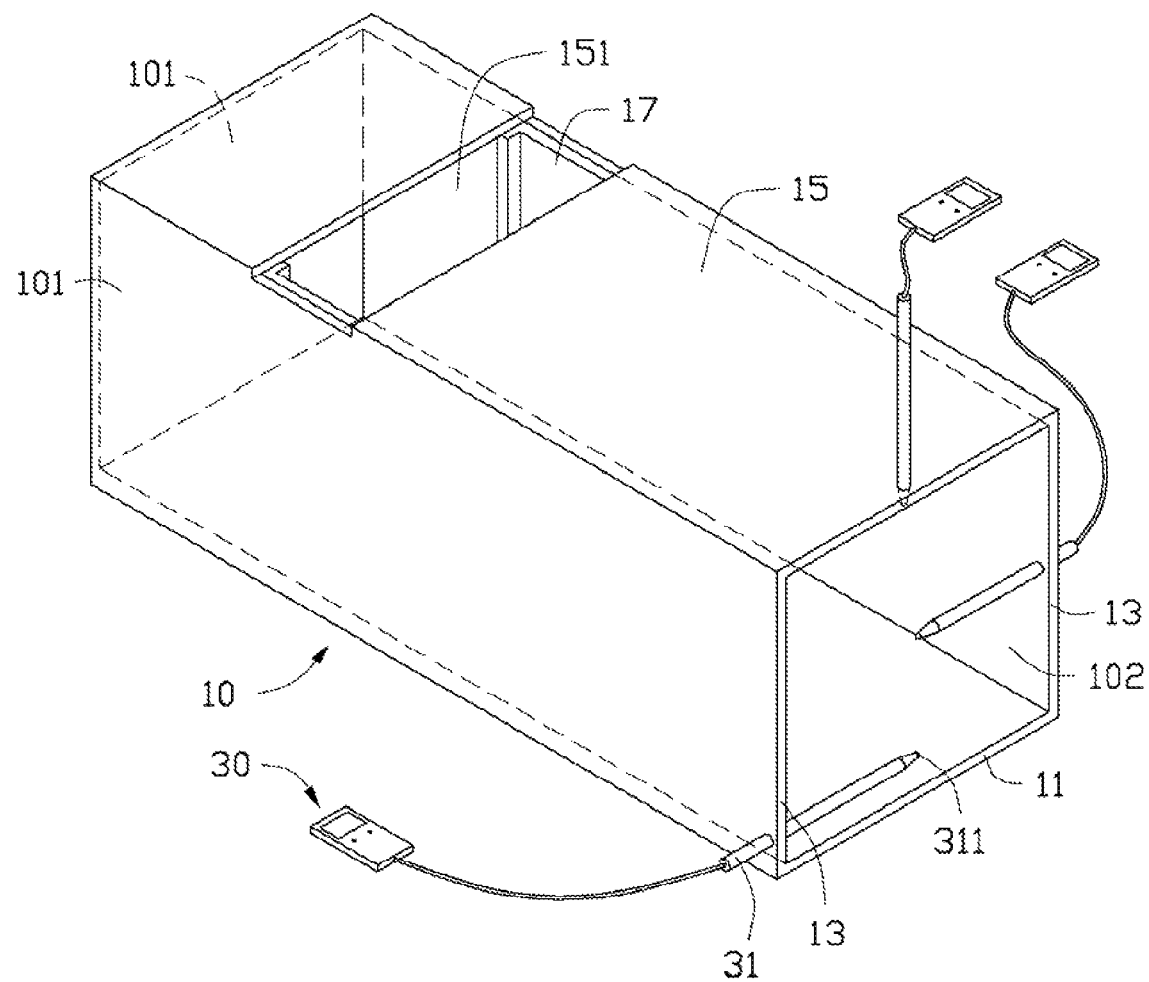
FIG. 1 is an isometric view of an exemplary embodiment of a fan testing apparatus.

Referring to FIG. 1, an exemplary embodiment of a fan testing apparatus includes an air duct 10, and three anemometers 30.

The air duct 10 is formed by a bottom wall 11, two opposite sidewalls 13 perpendicularly extending from opposite sides of the bottom wall 11, and a top wall 15 connected between tops of the sidewalls 13. An air inlet 101 and an air outlet 102 are respectively defined in opposite ends of the air duct 100. An access hole 151 is defined in the top wall 15 adjacent to the air inlet 101. Opposite guide rails 17 are correspondingly attached to inner sides of the sidewalls 13, right below the access hole 151.

In the embodiment, the three anemometers 30 respectively include three probes 31, which respectively extend through the two sidewalls and the top wall of the air duct 10 near the air outlet 102. Each of the probes 31 includes a sensor 311 formed at a distal end thereof, for measuring speed of airflow generated by a reference fan 60 or a to-be-tested fan 70, flowing through the air duct 10 from the air inlet 101 to the air outlet 102. The sensors 311 of the probes 31 are respectively positioned adjacent to a top, a center, and a bottom of the air outlet 102 of the air duct 10.

Figure 2:
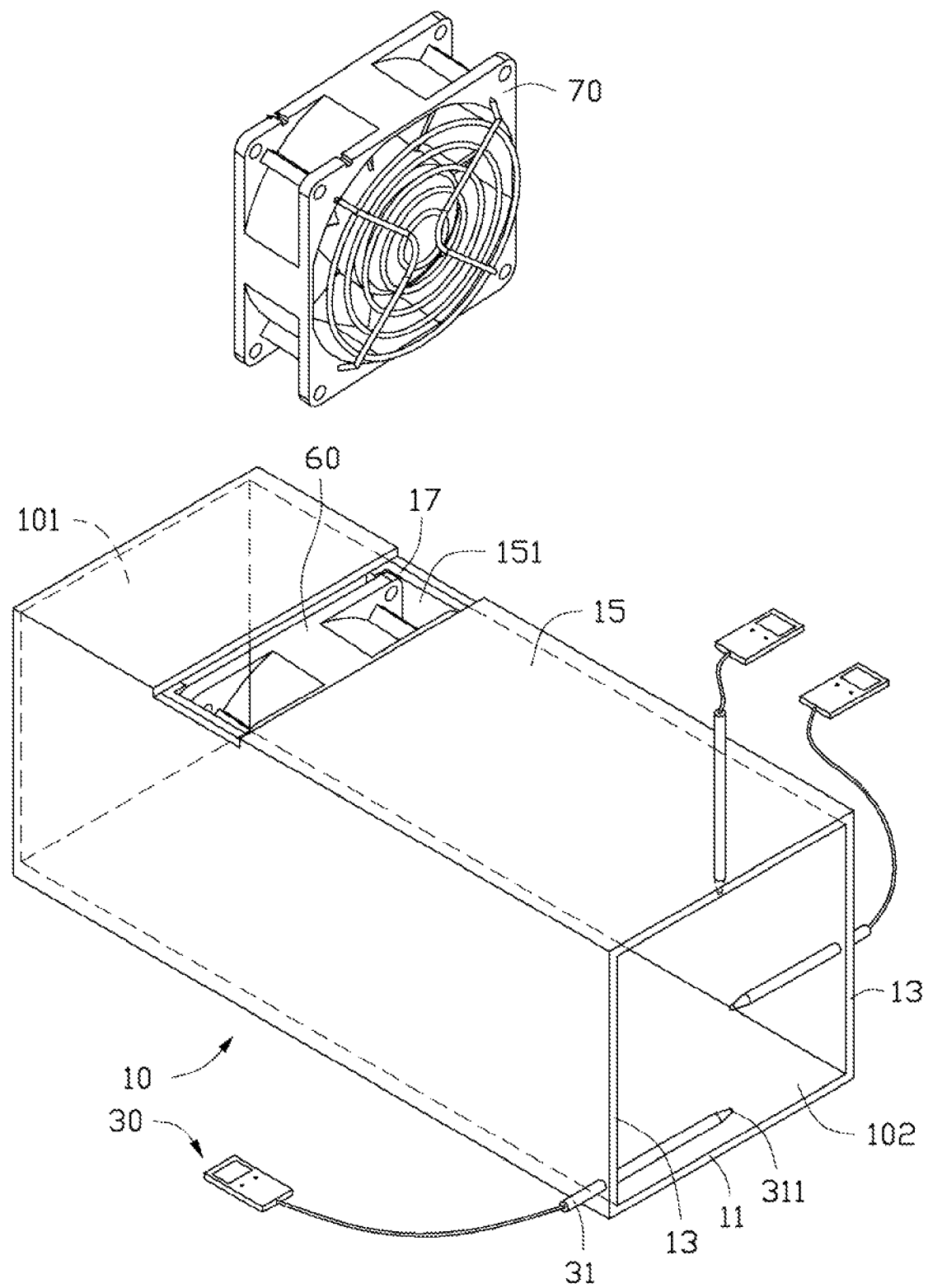
FIG. 2 is an isometric view of the fan testing apparatus of FIG. 1 together with a reference fan and a to-be-tested fan.
Figure 3:
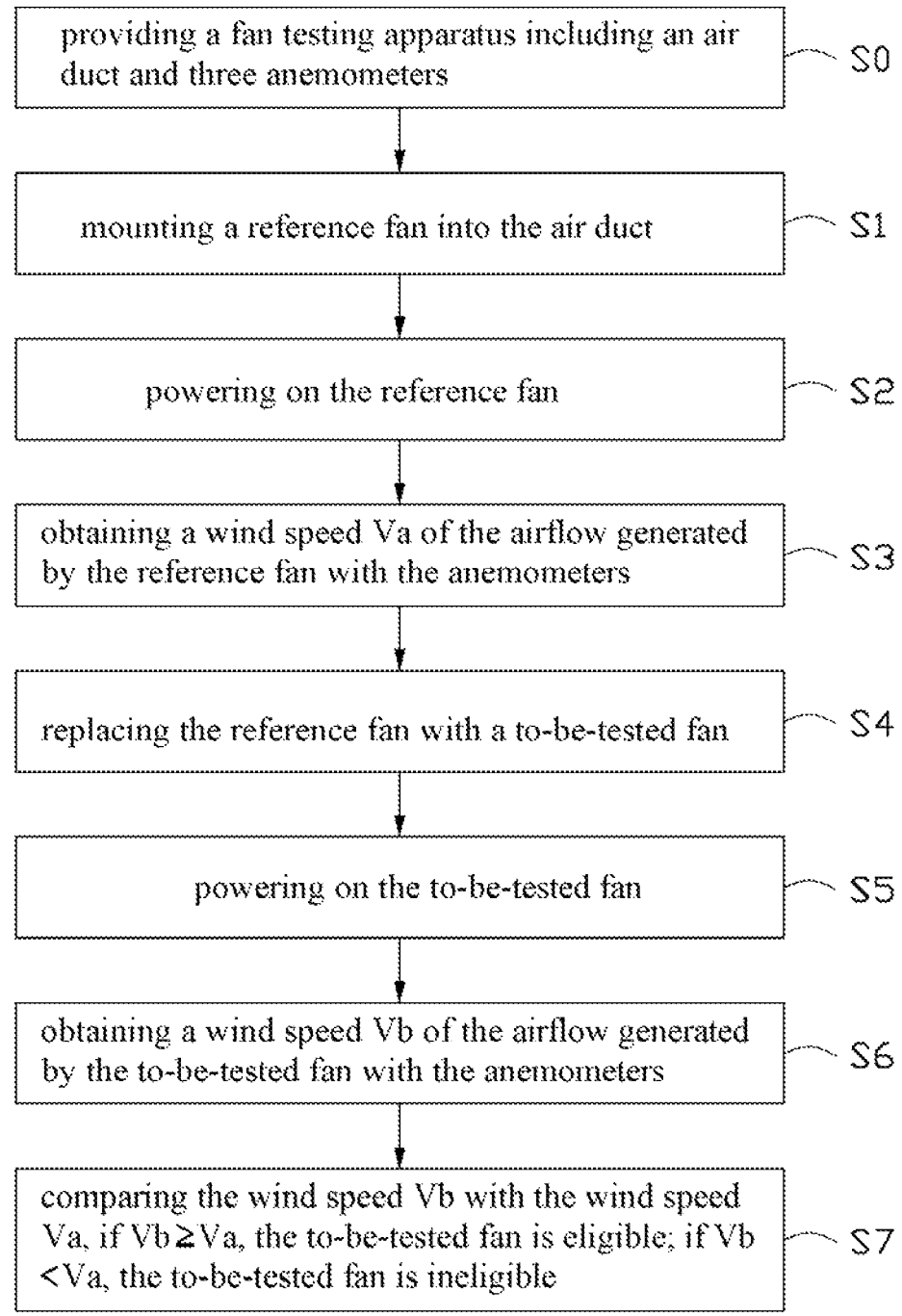
FIG. 3 is a flowchart of an exemplary embodiment of a fan testing method.

Referring to FIGS. 2 and 3, an embodiment of a fan testing method includes steps as follows:

In step S0: a fan testing apparatus as described above is provided;

In step S1, the reference fan 60, which is eligible for a certain application, is slid into the air duct 10 along the guide rails 17, through the access hole 151.

In step S2, the reference fan 60 is powered on with a PWM signal input to the reference fan 60 to control a rotating speed of the reference fan 60.

In step S3, the three anemometers 30 each measure airflow speed Vr. In the embodiment, a speed Va of the airflow of 10 is an average value of the three measured airflow speeds Vr.

In step S4, the reference fan 60 is taken out of the air duct 10, and the to-be-tested fan 70 is slid into the air duct 10 along the guide rails 17, through the access hole 151.

In step S5, the to-be-tested 70 is powered on, and controlled with the same PWM signal as that input to the reference fan 60.

In step S6, the three anemometers 30 each measure airflow speeds Vy. In the embodiment, a speed Vb of the airflow is an average value of the three measured airflow speeds Vy.

In step S7, the speed Vb is compared with the speed Va. If the speed Vb is greater or equal to the speed Va, the performance of the to-be-tested fan 70 is considered better than or equal to the reference fan 60. Therefore, the to-be-tested fan 70 is eligible. If the speed Vb is less than the speed Va, the performance of the to-be-tested fan 70 is considered worse than the reference fan 60 and ineligible.

It is to be understood, however, that even though numerous characteristics and advantages of the embodiments have been set forth in the foregoing description, together with details of the structures and functions of the embodiments, the disclosure is illustrative only, and changes may be made in detail, especially in the matters of arrangement of parts within the principles of the present disclosure to the full extent indicated by the broad general meaning of the terms in which the appended claims are expressed.

What is claimed is:

1. A fan testing apparatus comprising:
   a hollow air duct defining an air inlet and an air outlet respectively located at two opposite ends thereof;
   at least one anemometer mounted to the air duct adjacent to the air outlet to measure a speed of the airflow generated by a fan mounted in the air duct;
   wherein an access hole is defined in the air duct, adjacent to the air inlet of the air duct, for the fan inserted into or take out of the air duct; and
   wherein opposite guide rails are attached to insides of the air duct, aligned with the access hole.

2. The fan testing apparatus of the claim 1, wherein each of said at least one anemometer comprises a probe extending into the air duct, an airflow sensor is formed at a distal end of the probe.

3. The fan testing apparatus of the claim 2, wherein said at least one anemometer comprises three anemometers respectively positioned adjacent to a top, a center, and a bottom of the air outlet of the air duct.

4. A fan testing method comprising:
   providing a fan testing apparatus comprising:
      an air duct defining an air inlet, and an air outlet; and
      at least one anemometer mounted to the air duct adjacent to the air outlet;
   mounting a reference fan into the air duct;
   powering on the reference fan to generate an airflow entering the air duct through the air inlet, and out of the air duct through the air outlet;

obtaining a speed Va of the airflow generated by the reference fan, through the air outlet with said at least one anemometer;

taking the reference fan out of the air duct, and mounting a to-be-tested fan into the air duct instead;

powering on the to-be-tested fan to generate an airflow entering the air duct through the air inlet, and out of the air duct through the air outlet;

obtaining a wind speed Vb of the airflow generated by the to-be-tested fan, through the air outlet with said at least one anemometer;

comparing the speed Vb with the speed Va, if the speed Vb is greater than or equal to the speed Va, the to-be-tested fan is eligible; if the speed Vb is smaller than the speed Va, the to-be-tested fan is ineligible.

5. The testing method of claim 4, said at least one anemometer comprises three anemometers respectively positioned adjacent to a top, a center, and a bottom of the air outlet, for measuring speeds of the airflow.

6. The testing method of claim 5, wherein the speed Va is an average value of the speeds Vr of the airflow at the three locations generated by the reference fan and measured by the three anemometers; the speed Vb is an average value of the speeds Vy of the airflow generated by the to-be-tested fan at the three locations and measured by the three anemometers.

\* \* \* \* \*